A. SUNDH.
MOTOR CONTROL.
APPLICATION FILED DEC. 17, 1908.

1,011,268.

Patented Dec. 12, 1911.
6 SHEETS—SHEET 2.

A. SUNDH.
MOTOR CONTROL.
APPLICATION FILED DEC. 17, 1908.

1,011,268.

Patented Dec. 12, 1911.

6 SHEETS—SHEET 4.

Witnesses:
Arthur C. Mason
Ernest L. Gale Jr.

August Sundh
Inventor
By his Attorney
J. F. Rule

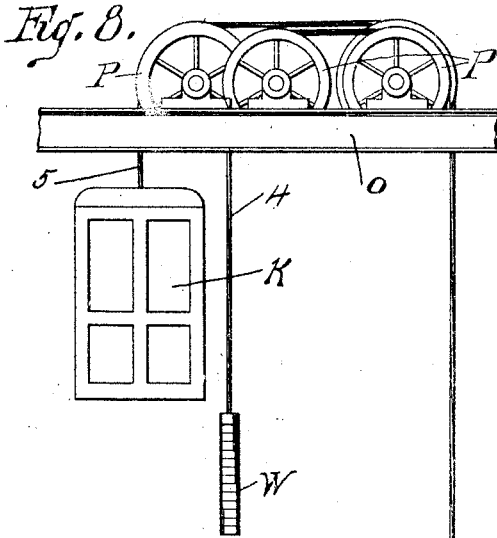
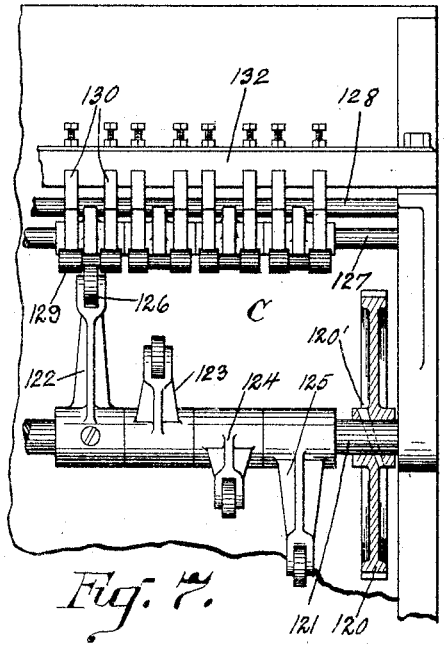
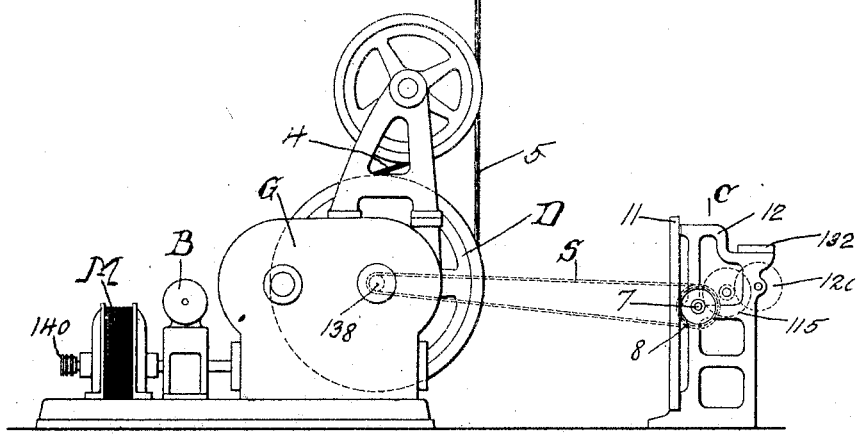

A. SUNDH.
MOTOR CONTROL.
APPLICATION FILED DEC. 17, 1908.

1,011,268.

Patented Dec. 12, 1911.
6 SHEETS—SHEET 6.

Witnesses:
Ernest L. Gale Jr.
James G. Bethell

August Sundh Inventor:
By J. F. Rule
his Attorney

UNITED STATES PATENT OFFICE.

AUGUST SUNDH, OF YONKERS, NEW YORK.

MOTOR CONTROL.

1,011,268.     Specification of Letters Patent.     Patented Dec. 12, 1911.

Application filed December 17, 1908. Serial No. 468,012.

*To all whom it may concern:*

Be it known that I, AUGUST SUNDH, a citizen of the United States, residing in Yonkers, in the county of Westchester and State of New York, have invented a new and useful Improvement in Motor Control, of which the following is a specification.

My invention relates to improvements in controlling devices for electric motors, and one of its objects is the provision of self-contained, practical and efficient means for controlling the operations of starting, stopping, reversing, and accelerating alternating current or other motors, more particularly those used in operating electric elevators or other hoisting machinery.

Generally speaking, my invention comprises means whereby a motor is started, stopped and reversed by means of manually operated contact devices, such as push-buttons, the acceleration of the motor to full normal speed in either direction being effected by means of a series of mechanically operated switches which are controlled in their movements by the motor itself through the medium of a magnetic clutch device and intermediate mechanism.

Other objects of the invention will appear hereinafter, the various novel features of construction being set forth in the following detailed description taken in connection with the accompanying drawings and the novel combinations of elements being set forth in the appended claims.

Figure 1:
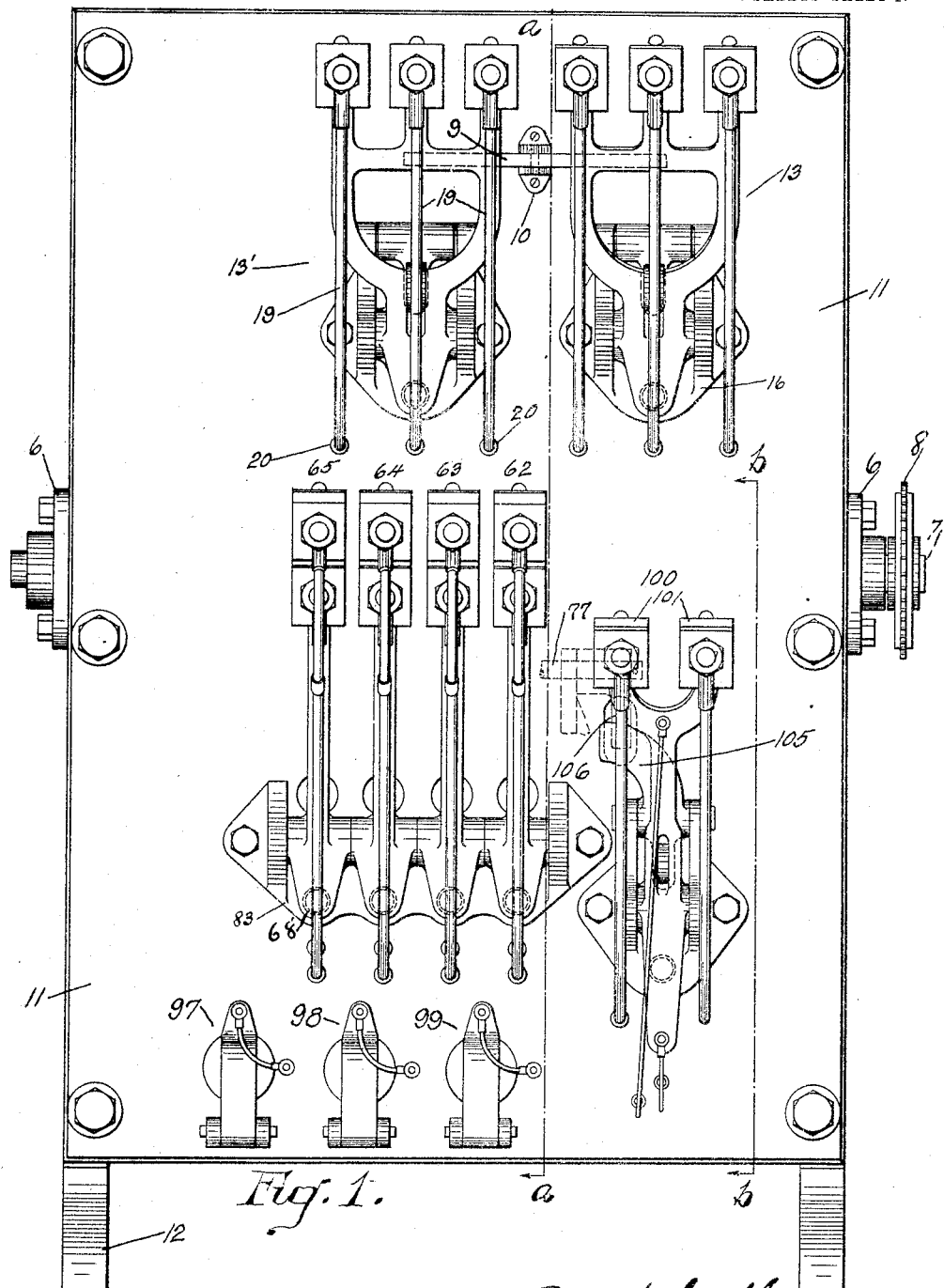
Figure 2:
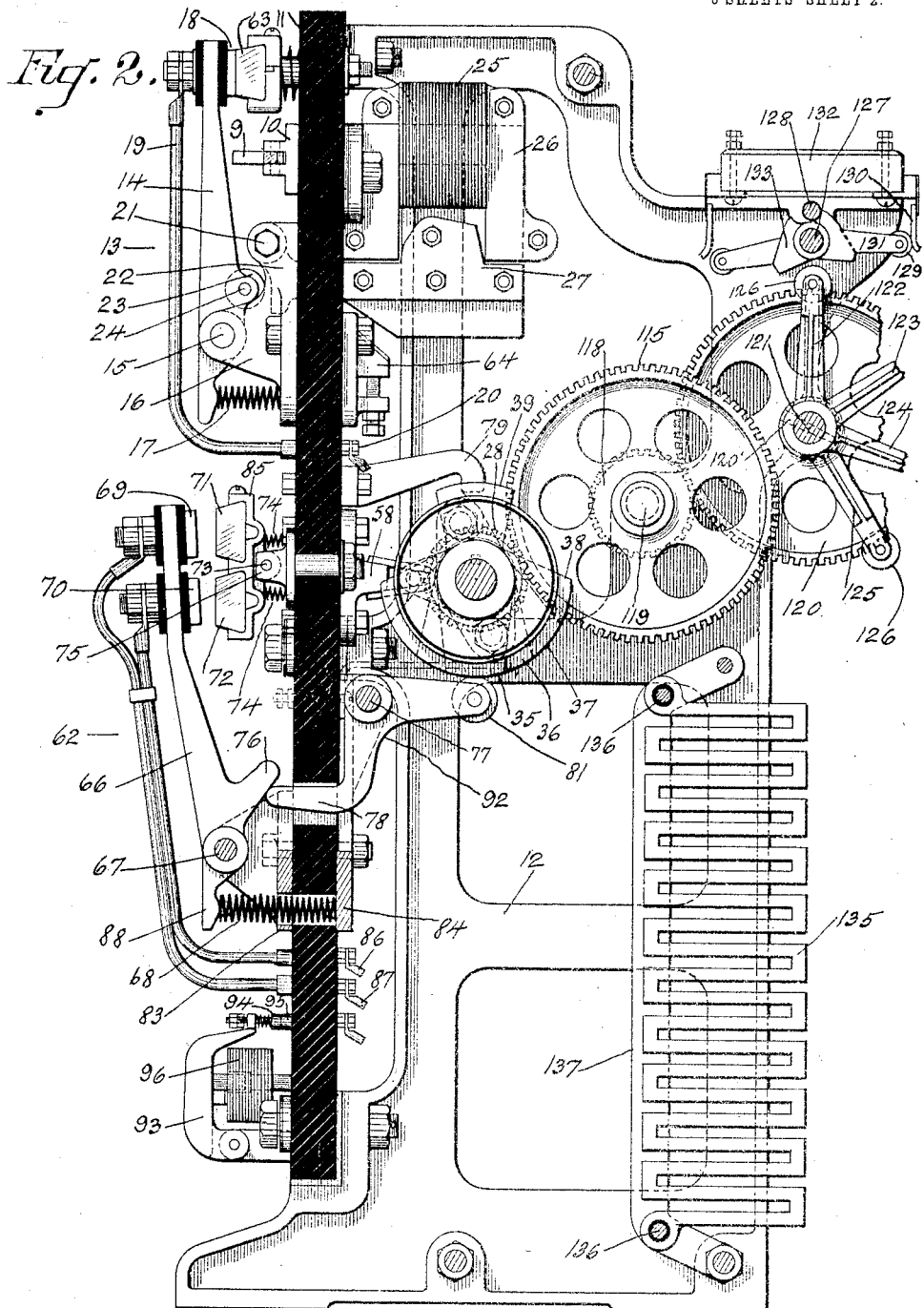
Figure 3:
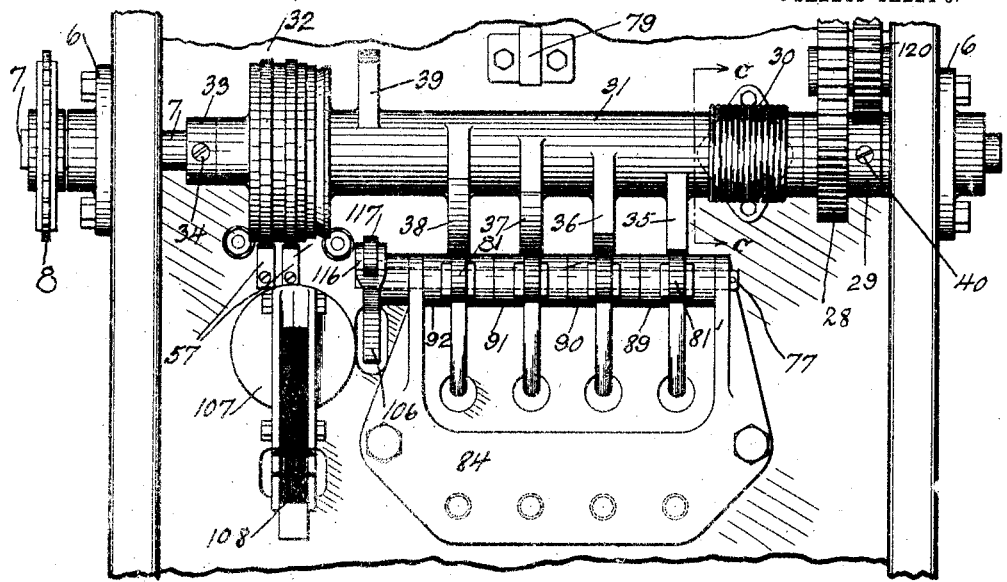
Figure 4:
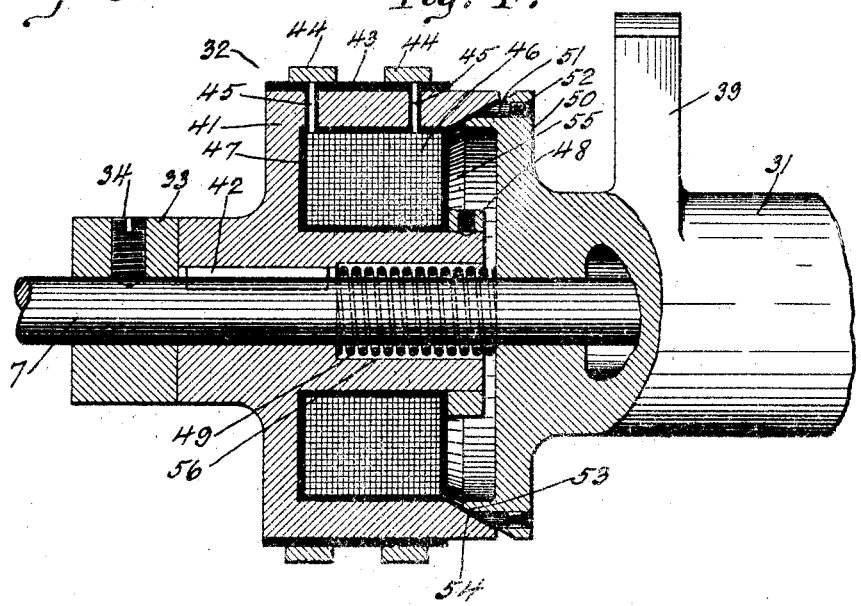
Figure 5:
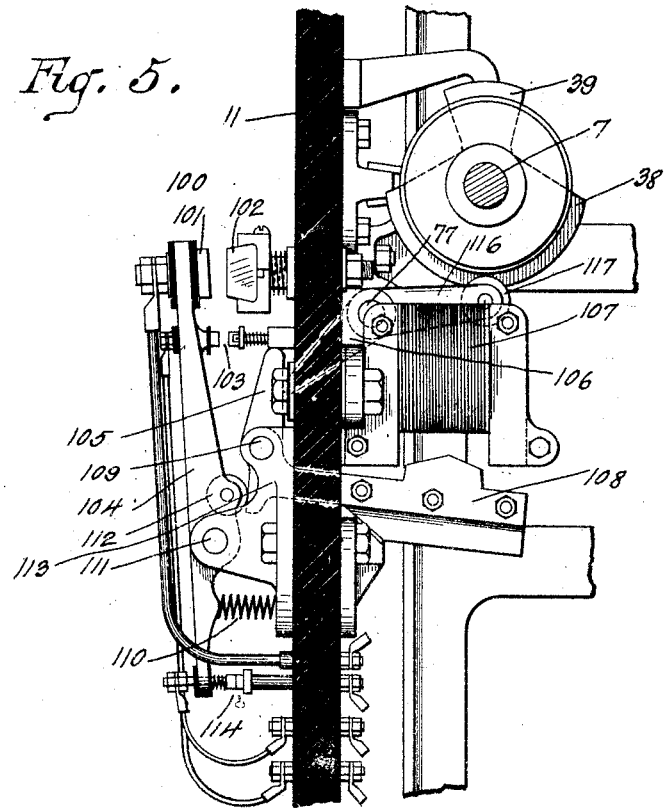
Figure 6:
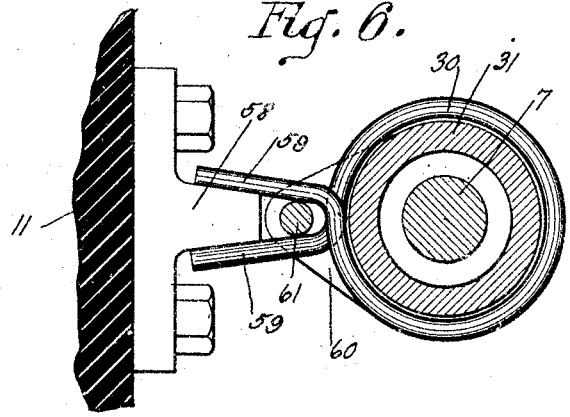
Figure 9:
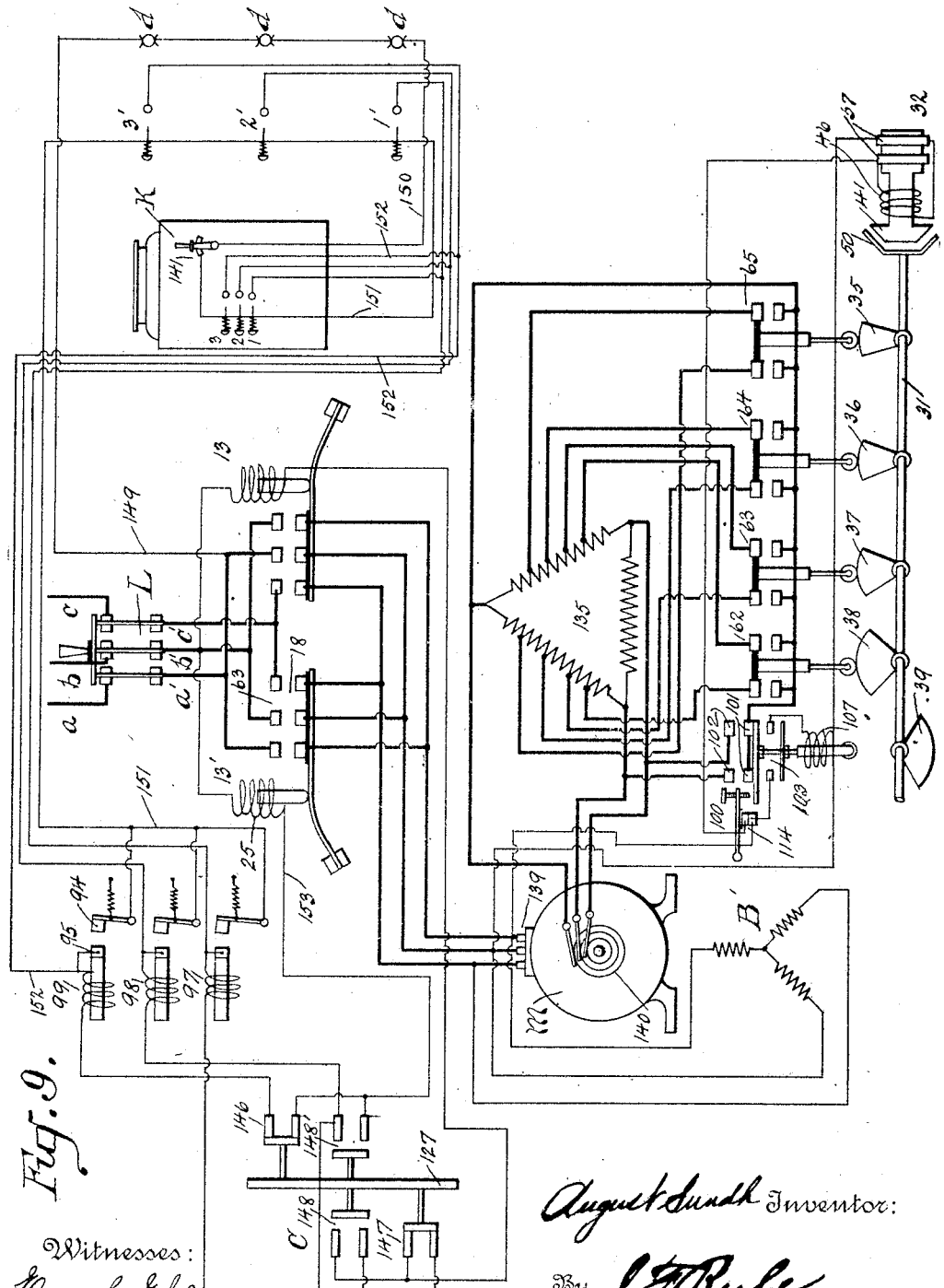

Figure 1 illustrates in front elevation a controller constructed according to my invention; Fig. 2 is a sectional side elevation taken on the line *a—a* of Fig. 1; Figs. 3, 4 and 7 are detail views of various parts of my apparatus; Fig. 5 is a sectional side view taken on the line *b—b* of Fig. 1; Fig. 6 is a sectional view on the line *c—c* of certain parts shown in Fig. 3; Fig. 8 shows a typical electric elevator system embodying my invention; and Fig. 9 is a wiring diagram of the electrical circuits therefor.

Referring to Figs. 1 and 2, 12 designates a metal frame-work to which is attached an insulating base 11, preferably of slate or marble, upon which the various electrical and mechanical parts are mounted. At the upper part of the insulating base 11 are mounted two similar reversing switches 13 and 13'. Each of these switches comprises a switch arm 14 which is pivoted at 15 to a bracket 16 secured to the base 11. At the upper end of the switch arm 14 are shown insulated contacts 18, and, while any desired number of such contacts may be carried by the switch arm, in the present instance there are but three. Suitable flexible conductors 19 connect these contacts to corresponding fixed studs 20 mounted upon the base 11. A compression spring 17 bears against a downwardly extending portion of the switch arm 14 and tends to swing the arm about its pivot 15, thereby causing the contacts 18 to electrically engage corresponding spring-pressed stationary fixed contacts 63 in alinement therewith.

26 and 25 designate a magnet frame and winding therefor, respectively, which are suitably mounted upon the back of the base 11 and arranged to co-act with a magnet armature 27 carried by a lever 22. The latter is pivoted at 21 to the bracket 16 and is adapted to engage the roller 23 pivoted at 24 to the switch arm 14. Since the lever 22 and connected armature 27 are massive in form and have considerable weight, they will tend to swing downwardly and exert a strong pressure against the roller 23, thereby forcing the switch arm 14 outwardly against the action of the compression spring 17. An adjustable stop 64 may be provided to limit the downward movement of the armature 27 and connected lever 22. A rocker arm 9 (Fig. 1) of suitable dimensions is pivoted to a stationary bracket 10 located between the reversing switches 13 and 13' and whose function is, to prevent both of the switches 13 and 13' from being closed at the same time, the rocker arm acting as a mechanical interlocking device.

A sprocket wheel 8 is secured to a shaft 7 which extends the full width of the controller and is adapted to freely turn in suitable bearings 6, 6 mounted upon either side of the controller framework 12. The shaft 7 carries upon it a magnetic clutch device 32, a sleeve 31 which carries the cams 35, 36, 37, 38 and 39, a centering spring 30, and a spur gear 28. Suitable collars 33 and 29 are secured to the shaft 7 near either end by means of the set-screws 34 and 40, respectively, which limit the end play of the various parts carried upon the shaft 7. The magnetic clutch device 32 is clearly shown in Fig. 4 and comprises two clutch members 41 and 50. The latter may be integral with the cam sleeve 31, as shown, or a separate part connected thereto. The peripheral surface 53 of this clutch member 50 is tapered so as to correspond with the corresponding tapered surface 54 of the other clutch member 41 adjacent thereto. The clutch member 41 is loosely mounted upon the shaft 7 and is secured against turning thereon by means of a feather 42, which, however, allows a longitudinal movement of the clutch element. An annular recess 55 is formed in the clutch element 41 which contains the magnet winding 46 which is thoroughly insulated on all sides by the insulation 47. Conductors 45, 45 connect the magnet winding 46 to suitable slip rings 44, 44 carried upon the periphery of the clutch member 41 and insulated therefrom by the insulation 43. The magnet winding 46 is securely held in place by means of the collar 48 and set-screw therefor. A compression spring 49 surrounds the shaft 9 and lies in a recess 56 formed in the clutch member 41 and surrounds the shaft 7. The function of this spring 49 is to force the clutch members 41 and 50 out of engagement with each other at their co-acting tapering contact surfaces 54 and 53, respectively, except at such times as the magnet winding 46 is energized. The engaging surface 53 of the clutch member 50 contains at equidistant points thereon a number of holes which are parallel to the axis of the shaft 7, and each contains a wedge-shaped plug 51 which is tapered to correspond to the clutch engaging surface 53 and which is pressed outwardly by means of a spring 52. These spring-pressed tapered plugs 51 not only assist the spring 49 to force the clutch members out of engagement with each other, but also insure that the clutch surfaces 54 and 53 will engage each other fair and true whenever they are brought into contact.

57, 57 designate suitable brushes which bear against the slip rings 44, 44 and by means of which current is supplied to the magnet winding 46. These brushes have sufficient width to allow a small horizontal movement of the slip rings 44, 44 without the latter being carried out of electrical engagement therewith.

As before pointed out, the cam sleeve 31 is loosely mounted on the shaft 7 and may be made hollow as shown in Figs. 4 and 6, so as to reduce its weight. This cam sleeve contains five cams 35, 36, 37, 38 and 39. The first four cams are equally spaced from each other and of varying size. The cam 39 is arranged on the sleeve 31 at an angle of 180 degrees from the cams 35, 36, 37 and 38, and at a suitable distance therefrom.

The normal position of the sleeve and cams is as shown, and in order to maintain it in this position a centering device is provided. This device is shown in detail in Fig. 6, and comprises an arm 60 connected to the sleeve 31 and having a pin 61 secured thereto which lies between the ends 59, 59 of a centering spring 80. This spring loosely surrounds the sleeve 31 and has its ends bent outwardly so as to embrace the pin 61 and a fixed stop 58 which is bolted in position upon the base 11. Any rotation of the sleeve 31 in either direction causes the pin 61 to tighten the coils of the spring 80, which thereupon exerts a strong reaction tending to return the sleeve back to normal position. A spur gear 28 is keyed or otherwise securely fastened to the shaft 7 adjacent the cam sleeve 31.

The cams 35, 36, 37 and 38 are adapted to operate similar resistance controlling switches 62, 63, 64 and 65, respectively. These switches are in many respects similar to the reversing switches 13 and 13'. Each comprises a swinging arm 66 pivoted on a rod 67 which is supported by a bracket 83, and carrying two insulated contacts 69 and 70 vertically arranged at the upper end, which are adapted to engage corresponding fixed contacts 71 and 72, respectively, carried by a holder 85 which is pivoted at 73 to a stationary bracket 75. Springs 74, 74 tend to maintain the contacts 71 and 72 and the holder 85 in a vertical position, but allow the latter to adjust itself when the switch 62 is closed so as to insure a good electrical contact between the contacts 69, 71 and 70, 72, respectively. Suitable flexible conductors connect the movable contacts 69 and 70 to the terminals 87 and 86, respectively. Each switch is normally held in open position against the action of a compression spring 68, one end of which bears against an extension 88 to the switch arm 66; the other end extends through the base 11 and bears against the bracket 84. Interposed between a lug 76 upon each switch arm and the cams 35, 36, 37 and 38 are bell crank cam levers 89, 90, 91 and 92, respectively. These cam levers are all carried upon a common pivot rod 77 supported by the bracket 84, and each lever, such as 92, carries a cam roller 81 upon one end which engages the corresponding cam 38, while the other end 78 passes through the base 11 and engages the lug 76 of the corresponding switch 62. Thus it is seen that as long as the cam rollers are in engagement with their respective cams the corresponding switches will be held open against the action of the switch closing springs, such as 68. A stop 79 is secured to the base 11 and arranged in the plane of rotation of the cam 37 and is for the purpose of limiting the rotation of the sleeve beyond a certain point, which in the present instance is somewhat less than 180 degrees. At the lower part of the base 11 are a number of similar magnetically operated switches 97, 98 and 99. Each comprises a magnet winding 96 adapted when energized to move a pivoted switch arm 93 so as to connect the contacts 94 and 95 carried by the switch arm and the base 11, respectively.

Referring more particularly to Fig. 5, it will be seen that the switch 100 is in many respects similar to the reversing switches 13 and 13'. A switch arm 104 carries at the upper end two contacts, such as 101, which are adapted to engage corresponding fixed contacts, as 102, when the switch arm is moved into closed position by means of a compression spring 110. Other contacts, as 103, are also brought into electrical engagement with each other upon closing the switch, while still other contacts 114 which are normally in engagement are separated and any electrical circuit therethrough interrupted. The magnet 107 when energized raises the armature 108 and lever 113, the latter swinging about its pivot 109 out of engagement with the roller 112 and allowing the spring 110 to force the switch closed. The lever 113 has an upwardly extending portion 105 which engages one arm 106 of a bell crank lever which extends through the base 11 and is pivoted upon the rod 77. The other arm 116 of this lever carries a roller 117 which is arranged to be engaged by the cam 39 when the same is rotated into engagement therewith, thereby depressing the arm 116 and forcing the arm 106, together with the lug 105, outwardly. In this manner the armature 108 and connected lever 113 are raised and the switch 100 is enabled to close its contacts. The spur gear 28 which is secured to the shaft 7 and rotated therewith, meshes with a larger gear 115 which is rigidly connected to a shaft 119 and gear 118, the latter gear being in mesh with a large gear wheel 120. This gear wheel is securely fastened to a shaft 121 by means of a pin 120', or other suitable means, and rotates therewith. A number of arms 122, 123, 124 and 125 are adjustably mounted upon the shaft 121, and secured in proper position by means of set-screws, or otherwise. These arms are provided with rollers, such as 126, which are adapted to operate circuit controlling switches mounted upon an insulating base 132 secured to the upper part of the framework 12. These circuit controlling switches comprise a series of contact arms such as 131 carrying contact rollers 129 at their outer ends which are adapted to be moved into and out of engagement with cooperating contacts 130 secured to the insulating base 132. The arms 131 are carried by or formed integral with cams 133 pivoted on the shaft 127 in position to be operated by the rollers 126 on the arms 122, 123, 124 and 125. A stop rod 128 limits the movement of the several contact arms and connected cams in both directions. This circuit controlling apparatus C is commonly known as a floor controller.

135 represents the motor starting resistance and is preferably made up of a number of cast iron grids which are mounted upon insulated rods 136, 136 secured to the framework 12 by means of brackets 137. Other forms of resistance may be used, if so desired, the type shown being the preferred form, owing to its compactness, cheapness and efficiency.

Fig. 8 illustrates diagrammatically a typical electric elevator system embodying my invention, in which M designates a hoisting motor which is connected through the usual gearing contained in the gear case G to a hoisting or winding drum D. Cables 4 and 5 are wound about the drum D, the cables 5 being connected to the elevator car K while the cable 4 is connected to a counterbalance weight W. Suitable guide pulleys P over which the cables 4 and 5 pass are carried by bearings supported on the overhead beams O. The sprocket wheel 8 of the controller C is connected by a sprocket chain S to a sprocket wheel 138 mounted upon the drum shaft. While this connection is the preferred one, the sprocket wheel 8 may be connected to any desired moving part of the elevator system, provided that the shaft 7 of the controller C is rotated in synchronism with the traveling elevator car.

The operation of the apparatus thus far described is as follows: Upon closing a circuit through the magnet winding 25, the armature 27 and connected lever 22 are lifted, the latter swinging about its pivot 21 and away from the roller 23 carried by the switch arm 14, thereby permitting the spring 17 to close the switch 13. Upon closing this switch, the motor and hoisting apparatus are set in motion and the sprocket wheel 8 connected thereto by the sprocket chain S will slowly rotate. Upon closing a circuit to the motor a circuit is also closed to the magnetic clutch 32 and the same is energized to move the clutch member 41 into frictional engagement with the clutch member 50. The sleeve 31 and connected cams 35, 36, 37, 38 and 39 will now rotate against the action of the centering spring 30. As the sprocket wheel 8, together with the shaft 7, clutch 32 and cam sleeve 31, continues to rotate, the cam 35 being the smallest is first moved out of engagement with the corresponding cam roller 81'. The spring 68' is now able to close the switch 65 and at the same time lift the swinging lever 89 and cam roller 81'. As the sleeve 31 continues to rotate, the cam 36 will run off its corresponding cam roller and the switch 64 will be closed. In a similar manner the switches 63 and 62 are closed successively as the cams 37 and 38 are rotated out of engagement with their respective cam rollers. The switches 65, 64, 63 and 62 are connected to the motor starting resistance and their successive closing effects the gradual acceleration of the motor to full speed as hereinafter described. At about this time the cam 39 engages the cam roller 117 and forces the latter downwardly, causing the lever arm 106 to bear against the lever 105 and thrust the latter outwardly. This operation swings the lever 113 and connected armature 108 about the pivot 109 and out of engagement with the roller 112 carried by the switch arm 104, thereby permitting the spring 110 to close the switch 100. As soon as the switch 100 has closed, the circuit to the magnetic clutch 32 is interrupted at the contacts 114 and the same becomes deënergized, thereby permitting the springs 49 and 52 to separate the clutch members 41 and 50. The sleeve 31 is no longer operatively connected to the rotating shaft 7 and is at once rotated back to its initial or normal position by means of the centering spring 30. As the sleeve 31 and connected cams rotate back to normal position, the cams 35, 36, 37 and 38 once more engage their respective cam rollers and the corresponding switches 65, 64, 63 and 62 are again moved into open position. At the same time the cam 39 is moved out of engagement with the cam roller 117 and the latter is free to move upwardly. This operation would effect the opening of the switch 100 were it not that the magnet 107 was energized by the closing of the switch contacts 103 so that the switch 100 remains closed. If for any reason the clutch 32 should fail to release its clutch members at the proper time, the stop 79 will effect a positive stopping of the cam sleeve 31.

It is readily seen that the shaft 7 continues to rotate as long as the motor M is in motion. Now, since the gear 28 is connected to the gear 120 through the train of reducing gearing comprising the gears 115 and 118, the gear 120, together with the shaft 121 and connected arms 122, 123, 124 and 125, will rotate at a much slower speed than that of the sprocket wheel 8. As these arms 122, etc., are thus slowly rotated in one direction or the other, depending upon the direction of rotation of the hoisting motor M, the rollers thereon engage the corresponding cams, such as 133, to effect the opening or closing of the corresponding switch contacts, such as 129 and 130.

Referring to the wiring diagram shown in Fig. 9, $a$, $b$ and $c$ designate conductors leading from a suitable source of three-phase alternating current supply, and L is a main line switch. The reversing switches 13 and 13′ are shown diagrammatically, each comprising a leaf spring carrying a plurality of insulated contacts adapted to engage corresponding fixed contacts arranged to coöperate therewith. The motor is shown as a three-phase motor with stator windings connected to the terminals 139, the rotor windings being connected through the slip rings 140 to a delta-connected motor starting resistance 135. The wiring diagram represents an automatically operated push-button system of elevator control adapted to three floors, with the car at rest at the second floor landing. 1, 2, 3 and 1′, 2′, 3′ designate the push-buttons in the car and at the floor landings, respectively. $d$, $d$, $d$, designate the door contacts located at the several floors, while 141 is a normally closed safety switch in the car, by means of which the latter may be stopped at any point in its travel. Assuming the main line switch L closed and the elevator car in the position shown, all of the landing doors being closed, the push-button 3 is now pressed to bring the car to the third or uppermost floor. Upon pushing the button 3, a circuit is closed from the main $a'$ through the wire 149, door contacts $d$, $d$, $d$, wire 150, safety switch 141, push-button 3, wire 152, through the magnet winding of the switch 99, floor controller contacts 146 which are closed at this time, wire 153, through the winding 25 of the reversing switch 13′, and to the main $b'$. This circuit includes the windings of the magnet switch 99 and the reversing switch 13′, and the same will be energized to close their contacts 94, 95 and 18, 63, respectively. The closing of the contacts 94 and 95 establishes a self-holding circuit around the push-button 3 and the latter may now be released without interrupting the circuit just traced. The operation of the reversing switch 13′ closes a circuit to the stator winding of the motor M and brake magnet B′, and the hoisting machinery is set in motion, running at slow speed since the starting resistance 135 is included in the rotor circuit. The magnet clutch 32 is energized at the same time that the motor receives current, since it is connected through the contacts 114 to the motor terminals. As the motor rotates at slow speed, the sleeve 31 and connected cams also rotate until the cam 35 moves out of engagement with its corresponding cam roller and allows the switch 65 to close. The closing of this switch short-circuits a portion of the starting resistance 135 and allows the motor to receive more current followed by a corresponding increase of speed. As the cams continue to rotate, the switch 64 is next closed, thereby short-circuiting an additional portion of the starting resistance, and the motor still further increases its speed. In a similar manner the switches 63 and 62 are successively closed, thereby short-circuiting further portions of the starting resistance. At about this time the cam 39 has rotated into a position to close the switch 100 which effects the closing of the contacts 101 and 102, thereby short-circuiting the entire starting resistance 135 and closing a circuit at the contacts 103 through the winding of the magnet 107 which becomes energized and maintains the switch 100 closed. The closing of the switch 100 opens the contacts 114, thereby interrupting the circuit to the magnet clutch 32 and the latter becomes deënergized, thereby allowing the sleeve 31 and connected cams to be rotated back to their original position by means of the returning spring and again open the switches 62, 63, 64 and 65. The switch 100 remains closed, however, due to the energization of its magnet, and the starting resistance being entirely short-circuited, the motor attains full speed, the car traveling in an upward direction. As the car approaches the uppermost landing corresponding to the push-button 3, the floor controller has been rotated into such a position that one of the arms carried thereby effects the separation of the contacts 146 and interrupts the circuit including the magnet switch 99 and reversing switch 13′ and they become deënergized and open their contacts. The deënergization of the reversing switch 13′ cuts off the current supply to the motor M, brake magnet windings B′ and magnet winding of switch 100. The brake B is now applied to stop the motor and hoisting mechanism, while the switch 100 opens and all parts come to rest with the elevator car opposite the third floor landing. As soon as the car moves away from the second floor, the floor controller operates to close the contacts 148, the contacts 148′ remaining open.

Should the button 1 or 1′ be pushed to cause the car to travel to the first floor, the operation would be similar to that just described, excepting that a circuit would be closed through the magnet switch 97, floor controller contacts 147, and magnet of reversing switch 13. The latter would be energized and close its contacts, thereby closing a circuit to the motor M and causing it to rotate in an opposite direction and lower the elevator car, the floor controller automatically opening the operating circuits at the contacts 147 as the car reaches the first floor landing. While the sleeve 31 and connected cams are rotated in a direction opposite to that produced when the elevator car was ascending, the switches 65, 64, 63, 62 and 100 operate to close their contacts successively in proper sequence just as before, since the cams are symmetrically disposed with respect to the corresponding cam rollers. The car may be brought to rest at any point in its travel in either direction by merely opening the safety switch 141, the latter being intended for emergency use only since the floor controller automatically stops the car at any predetermined landing without any interference.

While the system of electrical circuits herein shown and described is adapted to a three-phase alternating current automatic push-button control, the same could readily be modified to adapt it to other methods of control with either a direct or alternating current of any desired phase. Also, while the electrically operated switches herein shown are preferred over other types of switches, my invention is not limited to this particular form of switch.

It is obvious that various modifications could readily be made in the apparatus herein shown and described without departing from the spirit and scope of my invention, and for this reason I desire not to be limited to the precise construction and arrangement of parts disclosed.

What I claim as new and desire to have protected by Letters Patent of the United States is:—

1. The combination with an electric motor, of a sectional starting resistance, switches for controlling said starting resistance, a clutch device mechanically connected to the motor and to said switches, magnetic means for operating said clutch device, and means operated by one of said switches for effecting a disengagement of the clutch members.

2. The combination with an electric motor, of a starting resistance, a plurality of mechanically operated switches for controlling the starting resistance, a shaft driven by the motor, a clutch for operatively connecting said shaft to said switches, magnetic means for operating the clutch upon starting the motor, and means operated by one of said resistance controlling switches for effecting a disengagement of the clutch members.

3. The combination with an electric motor, of a plurality of accelerating switches, mechanical connections between the motor and said accelerating switches including an electromagnetic clutch, means for simultaneously closing a circuit to the motor and said clutch, and means operated by one of said accelerating switches for opening the circuit to the clutch.

4. The combination with an electric motor, of a starting resistance, switches for controlling the circuits of said resistance, a clutch device mechanically connected to the motor, switches for closing a circuit to the motor, electrical means for operating the clutch upon the operation of one of the motor circuit closing switches, and means operated by one of the resistance controlling switches for effecting a disengagement of said clutch.

5. The combination with an electric motor, of switches for controlling the starting, stopping and reversing of said motor, a plurality of accelerating switches, power transmitting mechanism between the motor and the accelerating switches including a magnetic clutch device, means associated with one of the first named switches for effecting the operation of the magnetic clutch device, and means operated by one of the accelerating switches for effecting a disengagement of said magnet clutch device.

6. The combination with an electric motor, of a plurality of accelerating switches, a cam member for successively operating said switches, mechanical connections between the motor and cam member including a magnetic clutch, means for effecting an engagement of the clutch upon closing a circuit to the motor, and means operated by one of said accelerating switches for effecting a disengagement of the clutch after the cam member has been moved a predetermined amount.

7. The combination with an electric motor, of a sectional resistance, a series of mechanically operated switches for controlling the resistance, a rotary cam member adapted to successively open or permit the closure of said switches, a shaft geared to the motor, a magnetic clutch arranged to operatively connect said shaft to the rotary cam member upon the closing of a circuit to the motor, and means for returning the rotary cam member to its original position after the resistance controlling switches have been operated and while the resistance is short-circuited.

8. The combination with an electric motor, of starting resistance, a plurality of accelerating switches for short-circuiting the starting resistance, a cam member for operating said switches, power transmission mechanism comprising an electromagnetic clutch between the motor and said cam member, means for simultaneously closing a circuit to the motor and clutch magnet, means dependent upon the operation of one of said accelerating switches for opening the circuit to said clutch magnet, and means to return the cam member to initial position while the resistance remains short-circuited.

9. The combination with an electric motor, of a sectional starting resistance, a series of mechanically operated switches for controlling the resistance, a rotary cam member adapted to successively open or permit the closure of said switches, a shaft geared to the motor, a magnetic clutch arranged to operatively connect said shaft to the rotary cam member upon the closing of a circuit to the motor, means for effecting a disengagement of said clutch upon the closing of one of said resistance controlling switches, means for returning said cam member to its original position upon disengagement of said clutch, and means for maintaining the starting resistance short-circuited independently of the position of the cam member.

10. The combination with an electric motor, of a plurality of accelerating switches, mechanical connections between the motor and switches for effecting the closing of said switches, and electrical means for maintaining one of said switches closed.

11. The combination with an electric motor, of a starting resistance therefor, a plurality of switches for controlling said resistance, mechanical means operated by the motor for successively closing said switches, an electromagnet comprising a magnet winding associated with one of said switches and operable to hold the said switch closed, means for closing a circuit to said winding upon the closing of said last-named switch, and means for returning the said mechanical means to initial position while the said switch remains closed.

12. The combination with an electric motor, of a plurality of accelerating switches, therefor, a cam member for effecting the successive operation of the accelerating switches, driving connections between the motor and cam member including a magnetic clutch, means for effecting an engagement of the clutch members upon closing a circuit to the motor, means operated by one of said accelerating switches for effecting a disengagement of said clutch members, and permitting a return of the cam member while the accelerating switches remain operated, and means comprising a magnet winding in a branch to the motor circuit for maintaining the last named switch in closed position as long as the motor circuit remains closed.

13. The combination with an electric motor, of a starting resistance, switches arranged to successively short-circuit portions of said starting resistance, mechanical means associated with the motor for closing said switches, and electrical means associated with the last operated of said switches for maintaining the same closed while the said mechanical means is restored to initial position.

14. The combination with an electric motor, of a starting resistance therefor, switches arranged to short-circuit portions of said starting resistance, cam mechanism for effecting the successive operation of said switches, a clutch device geared to the motor and arranged to operate said cam mechanism, means for effecting an engagement of said clutch device upon closing a circuit to the motor, means operated by one of said switches for effecting a disengagement of said clutch device, means to return the cam mechanism when the clutch device is disengaged, and electromagnetic means for maintaining the last named switch closed as long as the motor circuit remains closed.

15. The combination with an electric motor, of a starting resistance, a plurality of switches for short-circuiting portions of said resistance, mechanical means for effecting the successive closing of said switches, electrical means for holding one of said switches closed, and means associated with this last named switch for effecting the opening of the other switches.

16. In an electric elevator, the combination of a car, landings for said car, a hoisting motor, circuit closing devices upon the car and at each landing, means for starting said motor by operating any one of said circuit-closing devices, a controller, accelerating and stop switches mounted upon said controller, mechanical connections between said motor and controller for positively operating said stop switches, and frictional driving means associated with said mechanical connections for effecting the operation of said accelerating switches.

17. In an elevator, the combination with a car, of an electric motor, a shaft, a sleeve mounted on the shaft, cams carried by said sleeve, a clutch forming a driving connection between the sleeve and shaft, a floor controller geared to the shaft, driving connections between the motor and shaft, accelerating switches operated by said cams, and means for operating the clutch.

18. The combination of an electric motor, starting resistance, switches controlling said resistance, cam mechanism for operating said switches, a train of gearing comprising a clutch between the motor and said cam mechanism, means for operating said clutch to connect the motor and cam mechanism, means to automatically release the clutch when the switches have been operated, and means to return the cam mechanism when the clutch is released.

19. The combination of an electric motor, accelerating mechanism therefor comprising a series of accelerating switches, a shaft, a cam sleeve mounted thereon, cams on said sleeve operatively associated with said switches, an electromagnetic clutch comprising clutch members connected to the said shaft and cam sleeve, respectively, and means to control the circuits for the motor and clutch magnet.

20. The combination of a shaft, a cam sleeve mounted thereon, cams on said sleeve, an electric motor, accelerating apparatus therefor controlled by said cams, an electromagnetic clutch having its members connected to the said shaft and cam sleeve, respectively, and gearing connecting the motor and said shaft.

21. The combination of an electric motor, accelerating switches, a cam device for controlling the operation of said switches, an electromagnetic clutch having its members connected to the motor and cam device respectively, means for energizing the clutch magnet and effecting the operation of the said switches, and means releasing the clutch and returning the cam device when the said switches have operated.

22. The combination with a shaft, of a sleeve rotatable thereon, a clutch having its members connected to the shaft and sleeve, respectively, means for operating the clutch, a plurality of switches, and means carried by the sleeve for effecting the successive operation of said switches.

23. The combination with a shaft, of a sleeve mounted on the shaft, a clutch forming a driving connection between the sleeve and shaft, means for operating the clutch, a series of cams carried by the sleeve, and electric switches associated with said cams.

AUGUST SUNDH.

Witnesses:
 EDWARD A. FITCH,
 JOB FISH, Jr.